No. 855,702. PATENTED JUNE 4, 1907.
F. D. GODDARD.
URN.
APPLICATION FILED MAR. 23, 1904.
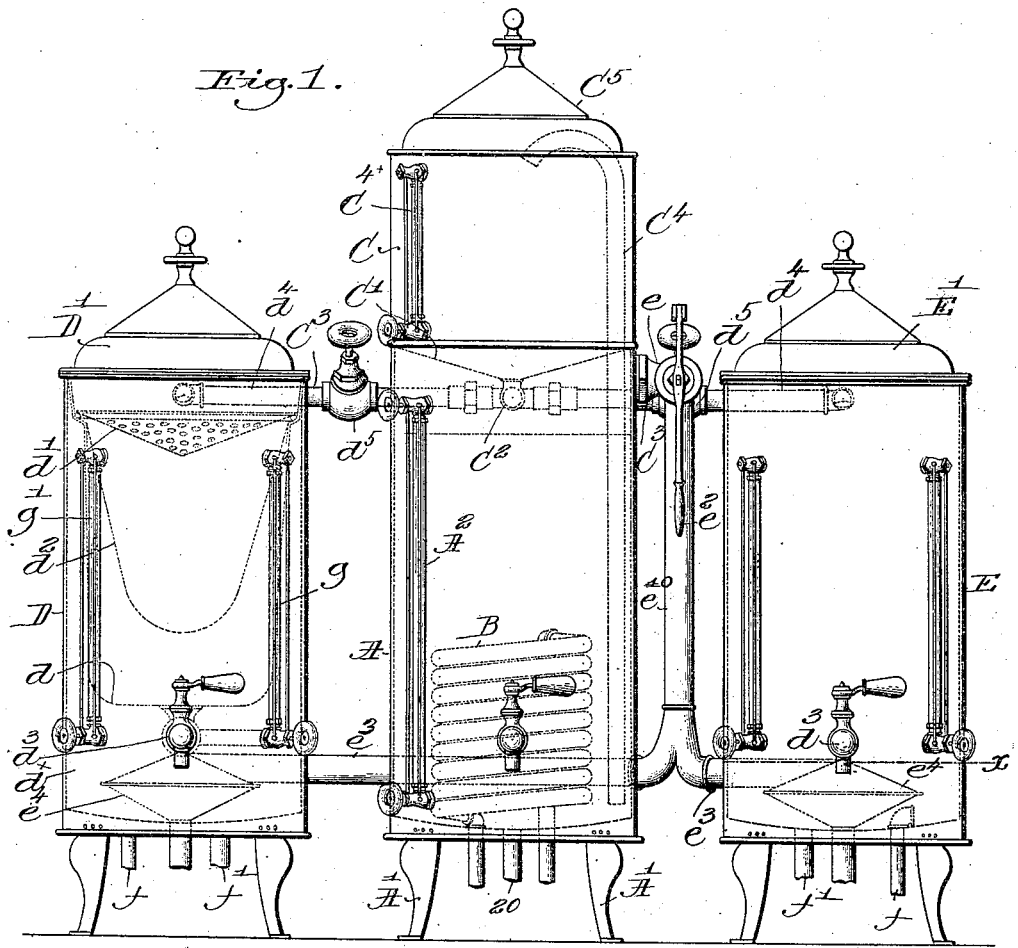
Fig. 1.
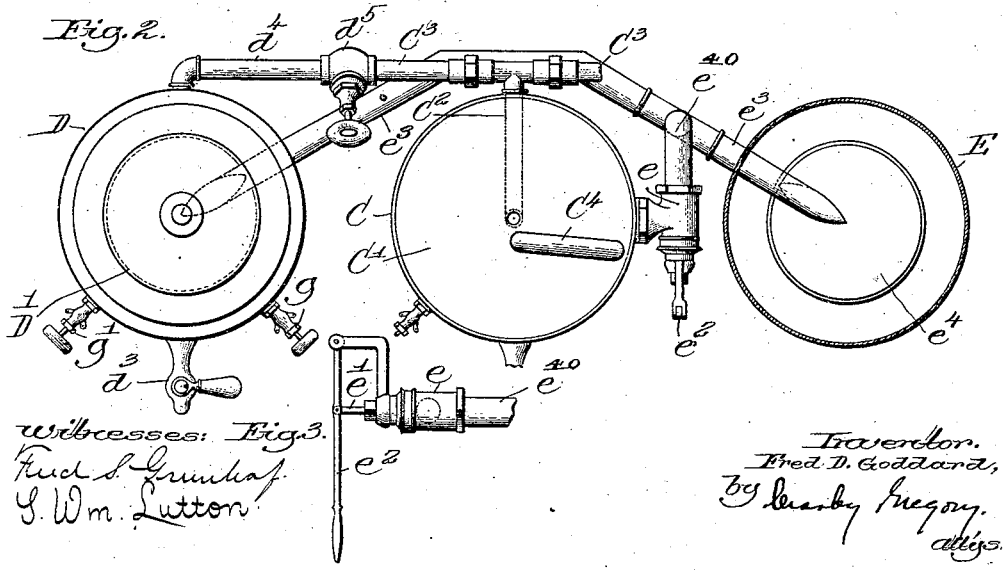
Fig. 2.
Witnesses:
Fred S. Grimhof
S. Wm. Lutton
Fig. 3.
Inventor.
Fred D. Goddard,
By Crosby Gregory.
Attys.

UNITED STATES PATENT OFFICE.

FRED D. GODDARD, OF EVERETT, MASSACHUSETTS, ASSIGNOR TO WALKER-PRATT MANUFACTURING COMPANY, OF BOSTON, MASSACHUSETTS, A CORPORATION OF MASSACHUSETTS.

URN.

No. 855,702.

Specification of Letters Patent.

Patented June 4, 1907.

Application filed March 23, 1904. Serial No. 194,632.

*To all whom it may concern:*

Be it known that I, FRED D. GODDARD, a citizen of the United States, residing at Everett, in the county of Middlesex and State of Massachusetts, have invented an Improvement in Urns, of which the following description, in connection with the accompanying drawings, is a specification, like letters on the drawings representing like parts.

This invention has for its object the production of a novel urn to be used in making coffee, tea, and the like. It is common in this class of urn to discharge water directly from the chamber in which it is boiled upon the coffee or tea, but herein I have devised an urn whereby the boiling water to be discharged upon the coffee or tea in the urn is taken in measured quantities from a measuring chamber that may be filled more or less whenever desired from the chamber containing the boiling water. Normally the steam generated in the chamber holding the water is carried into heaters in the urns containing the liquid coffee or tea, and whenever new quantities of coffee or tea are to be made, a valve may be closed, thus shutting off the steam from the heater referred to, letting it accumulate in the water vessel to force more or less boiling water into the measuring chamber to be used in making coffee or tea and the like.

Figure 1 in front elevation shows an urn embodying my invention, some of the interior parts being represented by dotted lines; Fig. 2 is a plan view of the parts shown in Fig. 1, the cover of the measuring chamber being omitted, and the right hand urn being shown in horizontal section. Fig. 3 is a detail of the valve for controlling the steam.

The vessel A having legs A' is adapted to receive the water to be heated for the production of coffee, tea or the like. This vessel, called the water vessel, contains a suitable water gage $A^2$ to indicate the quantity therein, and the water is heated by a coil B supplied with steam from any source in usual way. The top of the vessel A sustains a measuring vessel C having preferably a dished bottom C', shown by dotted lines, from which leads a pipe $C^2$ that is connected with one or more pipes $C^3$. Each pipe $C^3$ has a valve $d^5$, and extending from each valve is a pipe $d^4$ that leads into the upper end of an urn. In the present embodiment of my invention I have shown two such urns and consequently two pipes $C^3$, but my invention is not limited to the number of urns employed.

The measuring vessel sustains a pipe $C^4$ the lower end of which terminates near the bottom of vessel A, the upper end of the pipe being shown as overturned in the measuring vessel. The measuring vessel has a suitable measuring glass or gage $C^{4\times}$ that will indicate the quantity of boiling water in the measuring vessel.

Each urn D, E, any desired number, will receive in its upper end a suitable perforated dish $d'$ from which preferably will depend a bag $d^2$. These dishes will receive the ground coffee or tea on which the boiling water is to be discharged in the production of the beverage called coffee, tea or the like, and the bags are for the purpose of catching any grounds which may drop through the perforations in the dish $d'$. The bags hang in the chambers $d$ of the urn, said chambers receiving the liquid coffee or tea, and each urn has a cock or valve $d^3$ that the coffee or tea may be withdrawn as desired.

The lower part of each urn D or E has a heater $e^4$ of the shape shown by dotted lines, but instead I might use coils or any other usual form of heater through which steam may be led to keep hot the water in the space $d^\times$ of the urn, said space containing water to keep hot the coffee or tea in the chambers $d$ of each urn.

Each urn will have a suitable gage $g$ to show the quantity of coffee or tea therein, and another gage $g'$ to show the quantity of water in the chambers $d^\times$.

The upper end of the water chamber A receives a fitting $e$ forming a valve chamber, in which is movable a valve having a stem $e'$ connected with a lever $e^2$ by which to move the stem and valve to permit steam generated from the boiling water in the vessel A to pass outwardly through the valve and the pipes $e^{40}$ into a suitable pipe $e^3$, said pipe as shown in Fig. 2 communicating at its opposite ends with the two urns D, E, so that the steam generated in the chamber A when said valve is opened may enter the heaters and keep hot the water surrounding the chambers containing the coffee or tea or the like.

In the use of the urn the valve is normally open, and the water in the chamber A is kept boiling. To make a quantity of liquid coffee or tea or the like, the proper amount of ground coffee or tea is placed in the cup $d'$, of whatever urn or urns are used, and the valve is closed by moving the lever $e^2$ and immediately the passage of steam from the water chamber is arrested, causing the steam to act upon the surface of the boiling water in said water chamber and force the water upwardly through the pipe $C^4$ into the measuring chamber until the proper amount of boiling water for the coffee or tea to be made has been discharged into said measuring chamber. This done, the valve will be opened that the steam from the vessel A may again enter the heaters $e^4$ and the discharge of boiling water from the water chamber be arrested.

The pipe $C^2$ leading from the measuring chamber connects as stated with the pipes $C^3$, each having a suitable valve as $d^5$, and by opening this valve the boiling water will be permitted to flow from the measuring chamber into one or the other of the urns, as may be desired, onto the coffee or tea, the water coming thereupon with only its own pressure, so that the boiling water is permitted to percolate more slowly through the coffee or tea than though the boiling water were urged by steam pressure as heretofore.

The pipes $e^3$ are represented as connected with the upper sides of the heaters $e^4$.

The vessel D has a cover D', and the vessel E has a cover E'.

Prior to my invention I am not aware that boiling water has ever been supplied automatically into a chamber where the same could be accurately measured and then permitted to flow into a connected urn for the manufacture of coffee, tea, and the like, and consequently my invention is not limited to the exact shape of the water vessel, or the urns, or of the measuring vessel or its exact location with relation to the water vessel or the urns, nor is my invention limited to any stated number of urns, as I may use one or more, any desired number, according to the size of the battery desired for the production of coffee or tea.

Each urn has an inlet pipe $f$ and outlet pipe $f'$ for the water that is heated by the heaters $e^4$ in the chamber $d^\times$ and so also the water chamber A has a discharge 20 for the water whenever it is desired to remove all of the water therefrom and supply fresh water to be used in the production of coffee or tea.

Having described my invention, what I claim and desire to secure by Letters Patent is:—

1. In an apparatus of the class described, a water vessel, a measuring vessel situated above the water vessel, a pipe discharging into the top of the measuring vessel, said pipe extending nearly to the bottom of the water vessel, an urn separated from the water vessel, connections between the measuring vessel and urn, a steam heater within the urn, a pipe connecting the upper portion of the water vessel to said steam heater, and a valve in said pipe whereby when the valve is open the steam generated in the water vessel passes to the heater and when said valve is closed water is forced into the measuring vessel.

2. In an apparatus of the class described, a water vessel, means to heat the water therein, a measuring vessel, a pipe extending nearly to the bottom of the water vessel and discharging into the measuring vessel, an urn connected to the measuring vessel, a steam heater for the urn, a pipe connecting said heater to the top of the water vessel, and a valve in said pipe.

3. In an apparatus of the class described, a water vessel, means to heat the water therein, a measuring vessel, a pipe extending into the water vessel nearly to the bottom thereof and discharging into the measuring vessel, an urn connected with the measuring vessel, a water jacket about the urn, a steam heater to keep said water hot, a pipe connecting said steam heater with the top of the water vessel, and a valve in said pipe.

In testimony whereof, I have signed my name to this specification, in the presence of two subscribing witnesses.

FRED D. GODDARD.

Witnesses:
  NATHAN HEARD,
  MABEL PARTELOW.